United States Patent
Nishita (10) Patent No.: US 12,515,552 B2
(45) Date of Patent: Jan. 6, 2026

(54) CHARGING POWER MANAGEMENT DEVICE AND CHARGING POWER MANAGEMENT METHOD WITH GROUPING OF VEHICLES BASED ON DRIVING PLAN

(71) Applicant: Mitsubishi Electric Corporation, Tokyo (JP)

(72) Inventor: Yoshito Nishita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 650 days.

(21) Appl. No.: 17/912,048

(22) PCT Filed: Apr. 6, 2020

(86) PCT No.: PCT/JP2020/015469
§ 371 (c)(1),
(2) Date: Sep. 16, 2022

(87) PCT Pub. No.: WO2021/205498
PCT Pub. Date: Oct. 14, 2021

(65) Prior Publication Data
US 2023/0139438 A1 May 4, 2023

(51) Int. Cl.
*B60L 53/67* (2019.01)
*B60L 53/62* (2019.01)
*B60L 53/65* (2019.01)

(52) U.S. Cl.
CPC ............... *B60L 53/67* (2019.02); *B60L 53/62* (2019.02); *B60L 53/65* (2019.02)

(58) Field of Classification Search
CPC .......... B60L 53/67; B60L 53/62; B60L 53/65; B60L 2250/14
See application file for complete search history.

(56) References Cited

U.S. PATENT DOCUMENTS

| | | | |
|---|---|---|---|
| 2012/0253531 A1 | 10/2012 | Tyagi et al. | |
| 2015/0091503 A1* | 4/2015 | Hyde | B60L 53/64 320/108 |
| 2021/0300191 A1* | 9/2021 | Sakakibara | B60L 53/305 |

FOREIGN PATENT DOCUMENTS

| | | |
|---|---|---|
| CN | 102750591 A | 10/2012 |
| JP | 2011-254617 A | 12/2011 |

(Continued)

OTHER PUBLICATIONS

International Search Report and Written Opinion mailed on Jun. 9, 2020, received for PCT Application PCT/JP2020/015469, filed on Apr. 6, 2020, 9 pages including English Translation.

(Continued)

*Primary Examiner* — David V Henze-Gongola
(74) *Attorney, Agent, or Firm* — XSENSUS LLP (57) ABSTRACT

In creating a charging plan for an electric vehicle, calculation amount becomes enormous as the number of electric vehicles increases, leading to a problem of increasing the resources required for calculation. To solve this problem, the present disclosure includes a grouping unit configured to group a plurality of electric vehicles into an electric vehicle cluster based on a classification rule, a total charging power determination unit configured to determine total charging power of the electric vehicle cluster for each group for each time based on the restriction condition, and an individual charging power determination unit configured to determine individual charging power for each of the electric vehicles for each time based on the total charging power.

17 Claims, 4 Drawing Sheets

(56) References Cited

FOREIGN PATENT DOCUMENTS

JP   2012-213316 A   11/2012
JP   2015-220862 A   12/2015
JP   2018-42296 A    3/2018

OTHER PUBLICATIONS

Notice of Reasons for Refusal mailed on Dec. 8, 2020, received for JP Application 2020-546183, 12 pages Including English Translation.
The First Office Action mailed Jun. 10, 2025, in Chinese Application No. 202080099272.5, 17 pages including English translation.

* cited by examiner

| FACILITY | CHARGER/DISCHARGER | RATED OUTPUT |
|---|---|---|
| FACILITY 1 | CHARGER 1 | 6.00kW |
|  | CHARGER 2 | 6.00kW |
| FACILITY 2 | CHARGER 1 | 10.00kW |
|  | CHARGER 2 | 10.00kW |
|  | CHARGER 3 | 7.00kW |
| ... |  |  |
| FACILITY N | CHARGER 1 | 10.00kW |

FIG. 4

| EV NAME | SCHEDULED ARRIVAL DATE | SCHEDULED ARRIVAL TIME | SCHEDULED DEPARTURE DATE | SCHEDULED DEPARTURE TIME | SCHEDULED ARRIVAL FACILITY | REQUIRED AMOUNT OF STORED ELECTRICITY AT DEPARTURE |
|---|---|---|---|---|---|---|
| VEHICLE 1 | 2019/11/14 | 12:00 | 2019/11/14 | 18:00 | FACILITY 1 | 20.0kWh |
| VEHICLE 2 | 2019/11/14 | 08:00 | 2019/11/14 | 18:00 | FACILITY 1 | 20.0kWh |
| ... |  |  |  |  |  |  |
| VEHICLE N | 2019/11/14 | 09:00 | 2019/11/14 | 15:00 | FACILITY N | 20.0kWh |

FIG. 5

| EV NAME | SCHEDULED ARRIVAL DATE | SCHEDULED ARRIVAL TIME | SCHEDULED DEPARTURE DATE | SCHEDULED DEPARTURE TIME | SCHEDULED ARRIVAL FACILITY | REQUIRED AMOUNT OF STORED ELECTRICITY AT DEPARTURE | GROUP |
|---|---|---|---|---|---|---|---|
| VEHICLE 1 | 2019/11/14 | 12:00 | 2019/11/14 | 18:00 | FACILITY 1 | 20.0kWh | A |
| VEHICLE 2 | 2019/11/14 | 08:00 | 2019/11/14 | 16:00 | FACILITY 1 | 20.0kWh | B |
| VEHICLE 3 | 2019/11/14 | 09:00 | 2019/11/14 | 18:00 | FACILITY 1 | 20.0kWh | C |
| VEHICLE 4 | 2019/11/14 | 10:00 | 2019/11/14 | 20:00 | FACILITY 1 | 20.0kWh | D |
| VEHICLE 5 | 2019/11/14 | 12:00 | 2019/11/14 | 21:00 | FACILITY 1 | 20.0kWh | A |
| VEHICLE 6 | 2019/11/14 | 11:00 | 2019/11/14 | 18:00 | FACILITY 1 | 20.0kWh | E |
| VEHICLE 7 | 2019/11/14 | 08:00 | 2019/11/14 | 17:00 | FACILITY 1 | 20.0kWh | B |
| VEHICLE 8 | 2019/11/14 | 09:00 | 2019/11/14 | 15:00 | FACILITY 1 | 20.0kWh | C |
| VEHICLE 9 | 2019/11/14 | 09:00 | 2019/11/14 | 15:00 | FACILITY 1 | 20.0kWh | C |
| VEHICLE 10 | 2019/11/14 | 10:00 | 2019/11/14 | 18:00 | FACILITY 1 | 20.0kWh | D |

FIG. 6

| EV NAME | ELECTRIC STORAGE CAPACITY | AMOUNT OF CURRENT STORED ELECTRICITY |
|---|---|---|
| VEHICLE 1 | 30.0kWh | 15.0kWh |
| VEHICLE 2 | 30.0kWh | 10.0kWh |
| VEHICLE 3 | 30.0kWh | 12.0kWh |

CHARGING POWER MANAGEMENT DEVICE AND CHARGING POWER MANAGEMENT METHOD WITH GROUPING OF VEHICLES BASED ON DRIVING PLAN

CROSS-REFERENCE TO RELATED APPLICATION

The present application is based on PCT filing PCT/JP2020/015469, filed Apr. 6, 2020, the entire contents of which are incorporated herein by reference.

TECHNICAL FIELD

Technology relates to managing charging power.

BACKGROUND ART

In charging an electric vehicle, a number of restrictions concerning charging, such as the staying time and the departure time at and from a charging facility of the electric vehicle, the charging power capacity provided, and the electricity rate, are taken into consideration when a charging plan for the electric vehicle is created. For example, Patent Document 1 discloses that, in order to calculate the optimum charging/discharging plan, the mixed integer programming problem including a constraint condition for preventing reverse power flow and a restriction condition for limiting the upper limit of power consumption consumed by a plurality of households is solved.

PRIOR ART DOCUMENTS

Patent Documents

[Patent Document 1] Japanese Patent Application Laid-Open No. 2015-220862

SUMMARY

Problem to be Solved by the Invention

Conventionally, there are various restrictions in creating a charging plan for an electric vehicle. Therefore, in an attempt to manage charging plans for a plurality of electric vehicles altogether, due to a variety of restriction conditions, calculation amount becomes enormous as the number of electric vehicles increases, leading to a problem of increasing the resources required for calculation. The object of the present disclosure is to suppress such an increase in required computational resources.

Means to Solve the Problem

To solve the above problem, the present disclosure includes a grouping unit configured to group a plurality of electric vehicles into an electric vehicle cluster based on a classification rule, a total charging power determination unit configured to determine total charging power of the electric vehicle cluster for each group for each time based on the restriction condition, and an individual charging power determination unit configured to determine individual charging power for each of the electric vehicles for each time based on the total charging power.

Effects of the Invention

The suppression of an increase in computational resources is ensured.

DESCRIPTION OF EMBODIMENT(S)

First Embodiment

Figure 1:
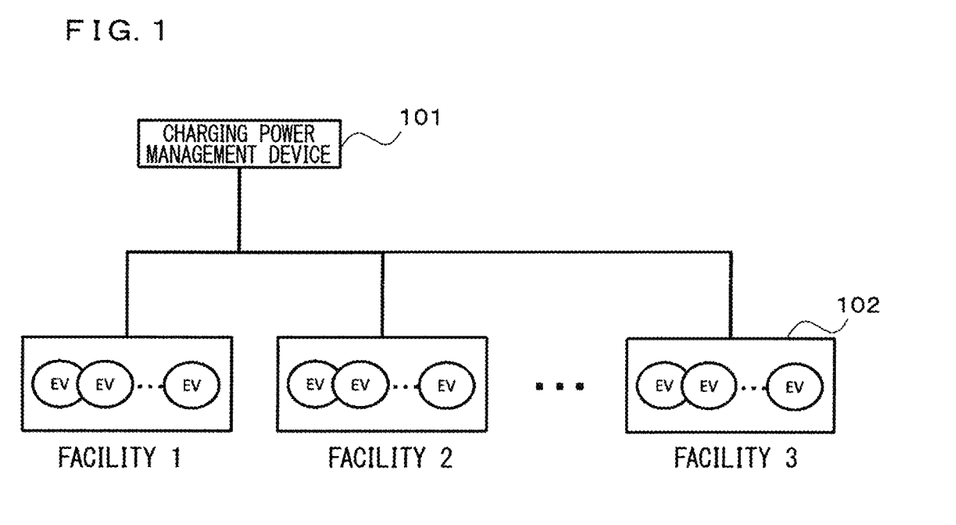
FIG. 1 A block diagram of a charging power management device and facilities in a first embodiment.

FIG. 1 is a block diagram of a charging power management device 101 and facilities 102 in a first embodiment. A facility 102 represents a facility for charging an electric vehicle (hereinafter referred to as "EV"). Here, the facility 102 refers to a facility such as a charging station that manages a plurality of EVs or a facility such as a private house, and the format thereof is not limited as long as a facility is the one where EVs are charged. The charging power management device 101 manages the facility 102 (Facility 1, Facility 2 . . . Facility N) and determines which EV to charge, at what time zone, and how much charging power to charge. Here, an EV refers to every vehicle that uses chargeable electric energy and is not limited to automobiles.

Figure 2:
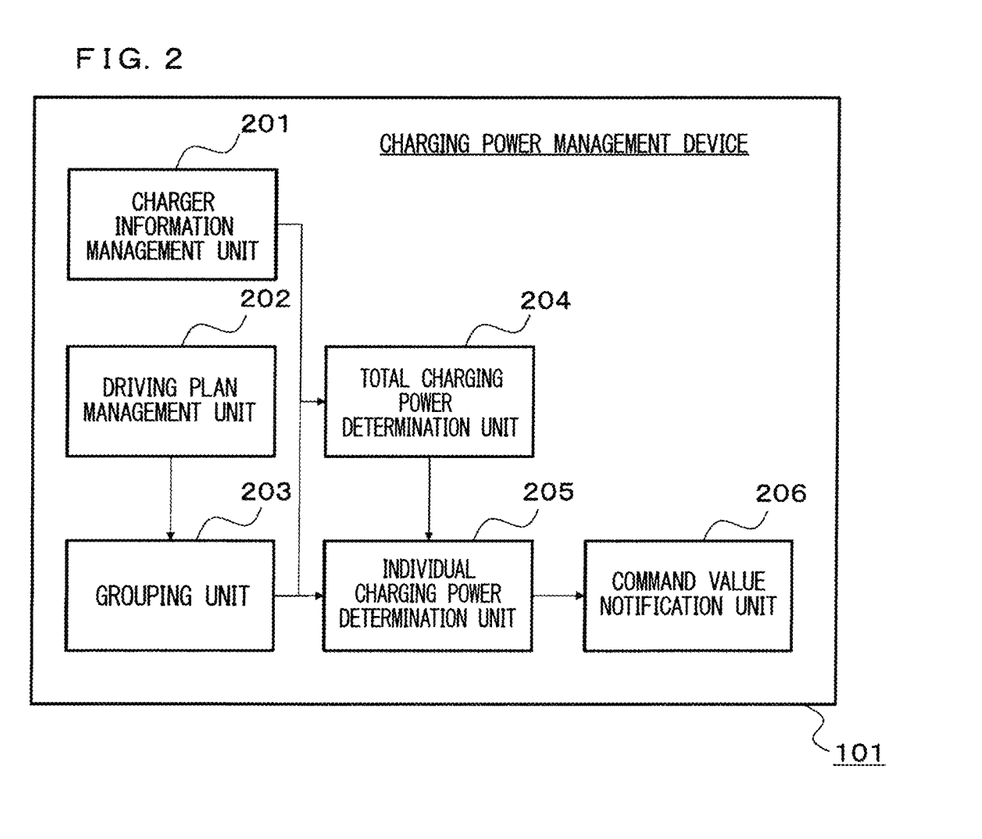
FIG. 2 A block diagram of a charging power management device in the first embodiment.

FIG. 2 is a block diagram of the charging power management device 101 the first embodiment. The charging power management device 101 includes a charger information management unit 201 that manages information on chargers installed in each facility 102, an driving plan management unit 202 that manages an driving plan for each EV, a grouping unit 203 that groups a plurality of EVs into EV clusters based on a classification rule, and a total charging power determination unit 204 that determines the total charging power of the EV cluster for each group for each time based on the restriction conditions.

In addition, the charging power management device 101 includes an individual charging power determination unit 205 that determines individual charging power for every EV for each time based on the total charging power, and a command value notification unit 206 that notifies a command value commanding the charging power to each charger based on the determined individual charging power. Next, the details of each unit will be described.

First, the details of the charger information management unit 201 will be described. The charger information management unit 201 manages facility information on chargers that each facility 102 holds, in which the EVs are to be charged. For example, the charger information management unit 201 manages information for specifying the facility where the chargers are installed, information for specifying the charger per se, information on the rated output of the charger, and the like. Here, the rated output refers to the output power capable for the charger to charge the EV. The charger information management unit 201 may acquire the facility information of the chargers from an external server or the like, or may directly receive the facility information from users, and the management method is not limited.

Figure 3:
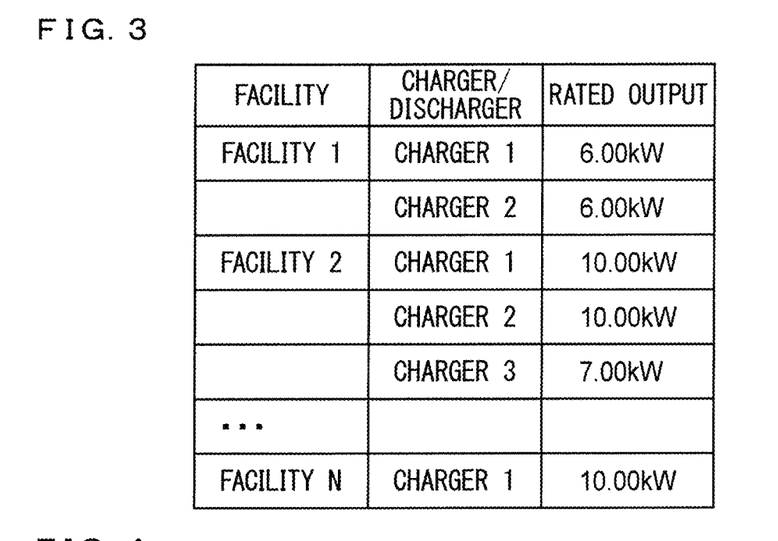
FIG. 3 A table illustrating an example of facility information of chargers that a charger information management unit manages in the first embodiment.

FIG. 3 is a table illustrating an example of the facility information of the chargers that the charger information management unit 201 manages in the first embodiment. In the example of FIG. 3, the information for specifying the facility 102, the information for specifying the charger, and the information for specifying the rated output of the charger are managed. From the facility information of the charger in FIG. 3, it can be understood that a charger 1 and a charger 2 are installed in Facility 1, the rated output of the charger 1 is 6.00 kW, the rated output of the charger 2 is 6.00 kW, and a charger 1, a charger 2 and a charger 3 are installed in Facility 2, the rated output of the charger 1 is 10.00 kW, the rated output of the charger 2 is 10.00 kW, and the rated output of the charger 3 is 7.00 kW. The charger information management unit 201 manages information about each facility 102 (Facility 1, Facility 2 . . . Facility N).

Next, the driving plan management unit 202 will be described. The driving plan management unit 202 manages driving plans for EVs. Here, the driving plan includes information to specify the facility 102 at which the EV is to be charged, a scheduled arrival time to the facility 102, a scheduled departure time from the facility 102, and information concerning the EV driving such as the required amount of stored electricity at departure being a minimum amount of stored electricity supposed to be needed at departure from the facility 102.

In the first embodiment, the driving plan is registered through a dedicated application for setting the driving plan. The dedicated application used when setting the driving plan may be a function of a satellite navigation system or an application available from a mobile terminal. Here, the driving plan management unit 202 may receive the driving plan directly from the user, or may acquire the driving plan from an external server or the like. The manner in which the driving plan is managed is not limited.

Figure 4:
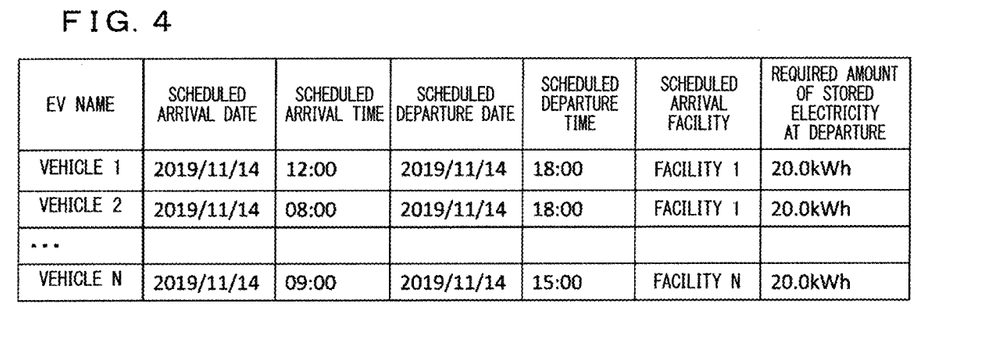
FIG. 4 A table illustrating an example of an driving plan managed by an driving plan management unit in the first embodiment.

FIG. 4 is a table illustrating an example of the driving plan that the driving plan management unit 202 manages in the first embodiment. In the example of FIG. 4, the driving plan includes information on the EV name, the scheduled arrival date, the scheduled arrival time, the scheduled departure date, the scheduled departure time, the scheduled arrival facility, and the required amount of stored electricity at departure.

The example in FIG. 4 illustrates that Vehicle 1 arrives at Facility 1 at 12:00 on Nov. 14, 2019, and departs from Facility 1 at 18:00 on Nov. 14, 2019. The required amount of stored electricity at departure of Vehicle 1 is 20.0 kWh. After that, information is managed for each vehicle.

FIG. 4 illustrates an example, and the EV may manage the information of the charger to be connected, and the content is not limited as long as the information is concerned with the plan related to the EV. Next, the details of the grouping unit 203 will be described. The grouping unit 203 groups a plurality of EVs into EV clusters based on the classification rule.

The classification rule is a rule for grouping EVs, and any rule may be applied thereto. For example, a rule using information such as the scheduled arrival time, the scheduled departure time, and the required amount of stored electricity at departure of the driving plan such as a rule, that the EVs having the same facility 102 for charging in the driving plan are grouped in the same group, or the like is conceivable.

Further, as the classification rule, a rule in which the EVs having close scheduled arrival times in the driving plan for EV are grouped in the same group, a rule in which the EVs having close scheduled departure times are grouped in the same group, or a rule in which the EVs having close required amounts of stored electricity at departure are grouped in the same group may be adopted. The rule to be adopted is not limited thereto and a rule of a combination of the above may also be adopted.

Here, although the classification rule using the driving plan has been described, the classification rule is not limited thereto, and a rule that randomly groups the EVs, or a rule that groups the EVs by vehicle type, without using the driving plan may also be adopted and the classification rule is not limited.

Further, in the present embodiment, although the grouping unit 203 groups EVs, the grouping unit 203 may group EV driving plans, and the method thereof is not limited as long as it is a method substantially grouping EVs.

Here, the determination of whether or not the scheduled arrival time is near is performed by calculating the absolute value of the difference between the values (when the scheduled arrival time of Vehicle 1 is 12:00 and the scheduled arrival time of Vehicle 2 is 8:00, the time difference is 4 hours, and this is its absolute value) and determining whether the value is a predetermined threshold or lower (for example, within 1 hour or within 2 hours).

In addition, the method of determining whether or not the scheduled arrival time is near is not limited as such, the method of counting the absolute values of the difference between the scheduled arrival times in ascending order, and determining that the scheduled arrival time is near until the count reaches the predetermined number may also be adopted, and any method may be adopted as long as it is a method of determining the closeness of a value. The same method shall be used for determining the scheduled departure time, the required amount of stored electricity at departure, and the like.

Next, a description will be given on the process of allocating EVs to the groups when there are already divided groups. Here, a description will be given on the determination on grouping based on the scheduled arrival time, however, the determination on grouping is not limited thereto and, determination on grouping based on information of estimate departure time, determination on grouping based on required amount of stored electricity at departure, or the like may also be adopted.

If there is already a group, the grouping unit 203 calculates the scheduled arrival time of group, which is the average value of the scheduled arrival time of each vehicle in a group, and determines whether the absolute value of the difference between the scheduled arrival time of group and the scheduled arrival time of an EV is less than or equal to the threshold, so as to determine whether the EV is assigned to the group.

For example, if there are Vehicle 1 (scheduled arrival time is 12:00) and Vehicle 2 (scheduled arrival time is 8:00) in the group, the scheduled arrival time of group is 10:00. Although the description given here is that the average value is set as the scheduled arrival time of group, this is not the only option, and the smallest value in the group may be set as the scheduled arrival time of group, the largest value may be set as the scheduled arrival time of group, and the method of determining the scheduled arrival time of group is not limited.

To give a specific example, if there are Vehicle 1 (scheduled arrival time is 12:00) and Vehicle 2 (scheduled arrival time is 8:00) in the group, the smallest value of 8:00 may be set as the scheduled arrival time of group, or the largest value of 12:00 may be set as the scheduled arrival time of group. These methods are examples, and the methods are not limited. The same method shall be used for determining the scheduled departure time, the required amount of stored electricity at departure, and the like.

Next, grouping EVs will be described when the driving plan is vector information. By expressing each type information of the driving plan with a vector, the grouping unit 203 can not only compare a single type of information but also combine a plurality of different types of information to group EVs.

The grouping unit 203 groups EVs based on the Euclidean distance of the vector between EVs. More specifically, the grouping unit 203 determines whether or not the Euclidean distances are close to each other based on the magnitude of the Euclidean distances between the vectors, and groups the EVs. Here, the magnitude of the Euclidean distance between the vectors can be determined by the same method as described above, such as whether the absolute value of the difference in the Euclidean distances is within the threshold value.

The method is not limited in determining the magnitude of the Euclidean distance. The grouping unit 203 digitizes information that is not expressed numerically, such as scheduled arrival facilities. For example, the position of the scheduled arrival facility is digitized with the latitude and longitude of the representative point.

In addition, when there is information that should be prioritized in the calculation of the Euclidean distance when determining by combining a plurality of types of information (for example, in a case where, even if the scheduled arrival times are slightly different, the EVs having the same facility 102 are given priority), the grouping unit 203 weights the information to be prioritized, calculates the weighted Euclidean distance, and determines whether or not the distance is short.

In the vector grouping method, grouping may be performed until the distance (degree of similarity) between each group becomes a certain level or more, however, grouping may be performed until the number of groups reaches the predetermined number by utilizing a clustering method such as k-means.

In a case where there is already a group and grouping is to be performed using a vector to assign the EVs into groups, the same assigning method as described above may be adopted. More specifically, the average value of the Euclidean distance of each element of the group may be set as the value of the group, the smallest value may be set as the value of the group, the largest value may be set as the value of the group, or the center of gravity of the EV vectors may be set as the value of the group.

Figure 5:
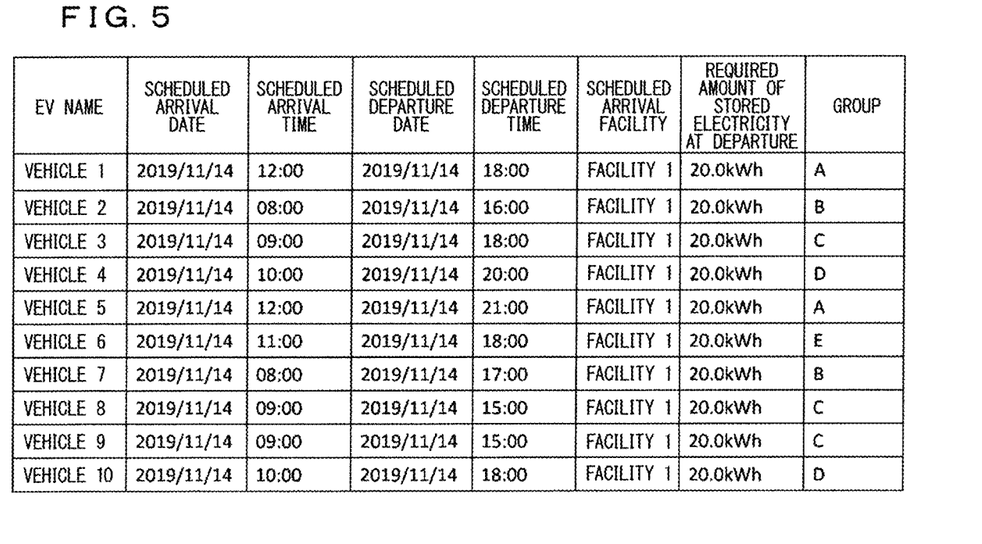
FIG. 5 A table illustrating results of grouping by a grouping unit in the first embodiment.

FIG. 5 is a table illustrating the result of grouping by the grouping unit 203. The example of FIG. 5 illustrates the result of grouping EVs whose scheduled arrival times are close. In the example of FIG. 5, Vehicle 1, Vehicle 5 are grouped in Group A, Vehicle 2, Vehicle 7 are grouped in Group B, Vehicle 3, Vehicle 8, Vehicle 9 are grouped in Group C, Vehicle 4, Vehicle 10 are grouped in Group D, and Vehicle 6 is grouped in Group E. In the example of FIG. 5, although the scheduled arrival date, scheduled arrival time, scheduled departure date, scheduled departure time, scheduled arrival facility, required amount of stored electricity at departure, and group information of each EV are managed, the managed information is not limited thereto.

Next, the details of the total charging power determination unit 204 will be described. The total charging power determination unit 204 determines the total charging power being the charging power for the EV cluster, for each group and for each time, based on the restriction conditions. The total charging power may be obtained by determining the charging power for all the chargers to which the grouped EVs are connected for each time.

The charging power for all the chargers to which the grouped EVs are connected is specified by identifying the chargers to which the EV can be connected and adding the charging powers of the identified chargers. More specifically, although not illustrated, the total charging power determination unit 204 specifies the charger the EV is to be connected by the information on the scheduled arrival facility to be specified in the EV driving plan and the equipment information of the charger installed in the facility, and obtains the total charging power. Further, the EV driving plan itself may manage which EV is scheduled to be connected to which charger, and the method by which the total charging power determination unit 204 obtains the total charging power is not limited.

The total charging power determination unit 204 determines the total charging power for each time; therefore, the unit creates a charging plan which is a plan of the total charging power for each group. Although the charging plan is a charging power plan here, the charging plan is not limited thereto. For example, the power storage amount may be obtained from the charging power, and the power storage amount plan may be used as the charging plan.

Here, the restriction condition is a condition for determining the total charging power, and various conditions can be considered. For example, various restriction conditions can be considered, such as the one in which the capacity is less than or equal to the combined rated outputs of the chargers to which the EVs are to be connected, and the one in which charging can be performed only while the EV stays at the facility 102. Further, the objective function itself, which aims to minimize the power purchase cost in the case of charging, which will be described later, may be considered as a restriction condition, and the restriction condition is not limited. The restriction condition in the present embodiment implies a condition for determining the total charging power.

Conventionally, it has been proposed to use various constraints when creating a charging plan for each EV, however, in the present embodiment, the details of the restriction conditions of the conventional example will be omitted. The restriction condition described in the present embodiment is not used for creating a charging plan for individual EVs, but is used for creating a charging plan (total charging power for each time) for each EV cluster. Next, the process of the total charging power determination unit 204 will be described.

First, the total charging power determination unit 204 integrates equipment information of the chargers managed by the charger information management unit 201 and equipment information being equipment information or the like on a rechargeable battery mounted on the EV described later, for each group grouped by the grouping unit 203. A charging plan is created by setting a restriction condition for an optimization problem from the integrated equipment information. In the present embodiment, as an optimization problem, an example in which an objective function is used to minimize the power purchase cost during the planning period will be described.

As a result, the total charging power determination unit 204 creates a charge plan that minimizes the power purchase cost during the planning period. First, as the integration of equipment information, the integration of the current power storage amount of each EV will be described. The integration of the current power storage amount within the group is as illustrated in the following Equation (1).

[Expression 1]

$$EV\_CUR\_CAP_{total} = \sum_{i=1}^{N} EV\_CUR\_CAP_{each}(i) \quad (1)$$

$EV\_CUR\_CAP_{total}$ represents the integrated current power storage amount of the EV, and $EV\_CUR\_CAP_{each}(i)$ represents the current power storage amount of each EV. N represents the number of EVs in a group. $EV\_CUR\_CAP_{total}$ is the sum of the current power storage amount of each EV connected to the charger of the facility 102 at the time when the current power storage amount is specified. When there is no EV staying at facility 102, the integrated current power storage amount of the EV will be zero. The integration of the power storage capacity of EV within the group is as illustrated in the following Equation (2).

[Expression 2]

$$EV\_CAP_{total}(t) = \sum_{i=1}^{N} \left\{ \begin{array}{ll} EV\_CAP_{each}(i) & (IN\_T \le t \le OUT\_T) \\ 0 & \text{else} \end{array} \right\} \quad (2)$$

$EV\_CAP_{total}(t)$ represents the integrated power storage capacity of EVs, $EV\_CAP_{each}(i)$ represents the power storage capacity of each EV, N represents the number of EVs in the group, IN_T is the scheduled arrival time of the EV, and OUT_T is the scheduled departure time of the EV. The total value of the power storage capacity of the EVs staying at the facility 102 of each group is the integrated power storage capacity of the EV. The integrated power storage capacity of the EV is determined for each time.

When there is no EV staying at facility 102, the integrated power storage capacity of the EV will be zero. Here, it is assumed that the EV staying at the facility 102 is connected to the charger of the facility 102. IN_T may be the time when the EV is connected to the charger, and OUT_T may be the time when the EV is disconnected from the charger. IN_T and OUT_T appearing in the following explanation are the same as in the above description. The integration of information of controllable range of the power storage capacity of EVs within the group is as illustrated in the following Equation (3) and Equation (4).

[Expression 3]

$$EV\_CAP\_MAX_{total}(t) = \quad (3)$$

$$\sum_{i=1}^{N} \left\{ \begin{array}{ll} EV\_CAP_{each}(i) \times EV\_SOC\_MAX_{each}(i) & (IN\_T \le t \le OUT\_T) \\ 0 & \text{else} \end{array} \right\}$$

-continued

[Expression 4]

$$EV\_CAP\_MIN_{total}(t) = \quad (4)$$

$$\sum_{i=1}^{N} \left\{ \begin{array}{ll} EV\_CAP_{each}(i) \times EV\_SOC\_MIN_{each}(i) & (IN\_T \le t \le OUT\_T) \\ 0 & \text{else} \end{array} \right\}$$

For Equation (3), $EV\_CAP\_MAX_{total}(t)$ represents the maximum value of the integrated controllable range of the EV, $EV\_CAP_{each}(i)$ represents the power storage capacity of each EV, and $EV\_SOC\_MAX_{each}(i)$ represents a ratio of the maximum controllable range with respect to the power storage capacity of each EV.

For Equation (4), $EV\_CAP\_MIN_{total}(t)$ represents the minimum value of the integrated controllable range of the EV. EV_CAPeach(i) represents the power storage capacity of each EV, and EV_SOC_MINeach(i) represents a ratio of the minimum controllable range with respect to the power storage capacity of each EV.

N represents the number of EVs in the group, IN_T is the scheduled arrival time of the EV, and OUT_T is the scheduled departure time of the EV. The maximum and minimum values of the integrated controllable range are determined for each time. When there is no EV staying at facility 102, the maximum and minimum values of the integrated controllable range will be zero. The integration of the rated output of the charger connected to each EV in the group is as illustrated in the following Equation (5). The integrated rated output here is the maximum charging power of the all EVs in the group.

[Expression 5]

$$EV\_OUT\_MAX_{total}(t) = \quad (5)$$

$$\sum_{i=1}^{N} \left\{ \begin{array}{ll} EV\_OUT\_MAX_{each}(i) & (IN\_T \le t \le OUT\_T) \\ 0 & \text{else} \end{array} \right\}$$

$EV\_OUT\_MAX_{total}(t)$ represents the integrated maximum charging power for the EVs (the maximum charging power for the all EVs in the group), and $EV\_OUT\_MAX_{each}(i)$ represents the maximum charging power for each EV (rated output of the charger connected to each EV), N represents the number of EVs in the group, IN_T is the scheduled arrival time of the EV, and OUT_T represents the scheduled departure time of the EV.

The integrated maximum charging power for the EVs is the total value of the maximum charging power for each EV in the group. The integrated maximum charging power for the EVs is determined for each time. When there is no EV staying at facility 102, the integrated maximum charging power will be zero. The integration of the charging efficiency of the charger connected to each EV in the group is as illustrated in the following Equation (6).

[Expression 6]

$$EV\_EFF_{total}(t) = \quad (6)$$

$$\frac{\sum_{i=1}^{N} \left\{ \begin{array}{ll} EV\_CAP_{each}(i) \times EV\_EFF_{each}(i) & (IN\_T \le t \le OUT\_T) \\ 0 & \text{else} \end{array} \right\}}{\sum_{i=1}^{N} \left\{ \begin{array}{ll} EV\_CAP_{each}(i) & (IN\_T \le t \le OUT\_T) \\ 0 & \text{else} \end{array} \right\}}$$

$EV\_EFF_{total}(t)$ represents the integrated charging efficiency of the EVs, $EV\_EFF_{each}(i)$ represents the charging efficiency of each EV in the group, $EV\_CAP_{each}(i)$ represents the power storage capacity of each EV in the group, N represents the number of EVs in the group, IN_T is the scheduled arrival time of the EV, and OUT_T is the scheduled departure time of the EV. The integrated charging efficiency is determined for each time. When there is no EV staying at facility 102, the denominator of Equation (6) will be 0, so the charging efficiency will be 0.

Next, the restriction conditions and the objective function of the optimization problem for determining the total charging power, which is the total charging power of the group, will be described. In the present embodiment, the total charging power is determined so as to minimize the electricity rate. In the present embodiment, although the objective function is intended to minimize the electricity rate, it is not limited thereto, and may be one that increases the electric power efficiency, and the objective function may be set arbitrarily. The objective function of the optimization problem that minimizes the electricity rate is as illustrated in the following Equation (7).

[Expression 7]

$$\min \sum_{t=1}^{T} (Rec(t) \times \text{unit }(t)) \quad (7)$$

Equation (7) is an objective function that minimizes the sum of the products of the hourly power receiving point power Rec(t) and the hourly electricity rate price unit (t). The electricity rate price unit is set by the electric power company or the like, and the total charging power determination unit 204 obtains the total charging power for each time that minimizes the power cost by solving the optimization problem with Equations (8) to (12) as restriction condition and Equation (7) as the objective function. Next, the restriction conditions will be described. Here, the power receiving point power is as illustrated in the following Equation (8).

[Expression 8]

$$Rec(t) = EV\_OUT_{total}(t) \quad (8)$$

Equation (8) represents a restriction equation (restriction condition) of the supply and demand balance restriction. The receiving power point power Rec(t) is equal to the total charging power $EV\_OUT_{total}(t)$, which is the charging power of the EV cluster in the group.

In the present embodiment, the power is purchased from one of the receiving points, the receiving point power and the total charging power are equal. However, Equation (8) is not limited because there are various cases such as the case where there is no charge for charging power due to private power generation, and the case where there are a plurality of receiving points. Next, the restriction condition for the upper and lower limits of the receiving point power are as illustrated in Equation (9).

[Expression 9]

$$Rec\_Min \leq Rec(t) \leq Rec\_Max \quad (9)$$

Equation (9) represents the upper and lower limits of the receiving power point power, Rec(t) represents the receiving power point power, Rec_Min represents the lower value of the receiving power point power, and Rec_Max represents the upper value of the receiving power point power. Next, the restriction condition for the upper and lower limits of the total charging power are as illustrated in Equation (10).

[Expression 10]

$$0 \leq EV\_OUT_{total}(t) \leq EV\_OUT\_MAX_{total}(t) \quad (10)$$

Equation (10) represents the restriction condition for the upper and lower limits of the total charging power. $EV\_OUT_{each}(t)$ represents the total charging power which is the charging power of the EV cluster for each group, and $EV\_OUT\_MAX_{total}(t)$ represents the maximum charging power which is the upper limit of the total charging power. The maximum charging power, which is the upper limit value here, indicates the maximum charging power for the integrated maximum charging power of the EVs described in Equation (5). The lower limit value of the total charging power is 0. Next, the restriction equation for the upper and lower limits of the controllable range of the integrated power storage capacity of the EVs in the group is as illustrated in Equation (11).

[Expression 11]

$$EV\_CAP\_MIN_{total}(t) \leq EV\_PL\_CAP_{total}(t) \leq EV\_CAP\_MAX_{total}(t) \quad (11)$$

$EV\_PL\_CAP_{total}(t)$ represents the integrated power storage capacity of the EVs in the group. $EV\_CAP\_MIN_{total}(t)$ represents the minimum value of the controllable range of the integrated power storage capacity, and $EV\_CAP\_MAX_{total}(t)$ represents the maximum value of the controllable range of the integrated power storage capacity. Here, $EV\_CAP\_MAX_{total}(t)$ represents the maximum value of the integrated controllable range of the EVs described in Equation (3). $EV\_CAP\_MIN_{total}(t)$ represents the minimum value of the integrated controllable range of the EVs described in Equation (4).

The integrated power storage capacity is a value determined for each time. That is, it represents the state of the power storage capacity for each time, and by obtaining $EV\_PL\_CAP_{total}(t)$, the charging plan of the power storage capacity is obtained. Next, the restriction equation (restriction condition) representing the state change of the integrated power storage capacity (charging plan) of the EVs in the group is expressed as Equation (12).

[Expression 12]

$$EV\_PL\_CAP_{total}(t) = EV\_PL\_CAP_{total}(t-1) + EV\_EFF_{total}(t) \times EV\_OUT_{total}(t) \quad (12)$$

$EV\_PL\_CAP_{total}(t)$ represents the integrated power storage capacity of the EVs in the group, $EV\_EFF_{total}(t)$ represents the integrated charging efficiency of the EVs calculated by Equation (6), and $EV\_OUT_{total}(t)$ represents the total charging power which is the charging power of the EV cluster in the group calculated by Equation (8). In Equation (12), the power storage capacity at a certain time t indicates that it is obtained by adding the power storage capacity at a time one unit before (t−1) to the product of the total charging power at time t and the integrated charging efficiency of the EVs at time t.

By solving the optimization problem using the optimization solver as described above, the total charging power determination unit 204 can determine the total charging power, which is the charging power of the EV group, for each cluster and for each time. Here, the charging power of the EV cluster for each group indicates the total charging power for all the chargers to which the grouped EVs are connected.

The total charging power determination unit 204 determines the total charging power for each time, thereby, creating a charging plan which is a plan of the power charging capacity for each group. In the present embodiment, although the charging plan is planned by the power storage capacity, the plan may be created by the charging power, and the method of creating the plan is not limited.

Next, the details of the individual charging power determination unit 205 will be described. The individual charging power determination unit 205 determines the individual charging power, which is the individual charging power of each EV, based on the total charging power for each group determined by the total charging power determination unit 204. The total charging power determined by the total charging power determination unit 204 is determined for each time; therefore, the individual charging power determination unit 205 can determine the individual charging power for each time based on the total charging power.

More specifically, the individual charging power determination unit 205 distributes the total charging power to each EV based on the ratio of the difference between the power storage capacity of the EVs in the group and the current power storage amount, and determines the individual charging power for each time. Here, although the power storage amount refers to the current power storage amount for each time, this is not limited thereto, and may be distributed based on the power storage amount when the EV arrives at the facility 102, and the timing therefor is not limited.

Figure 6:
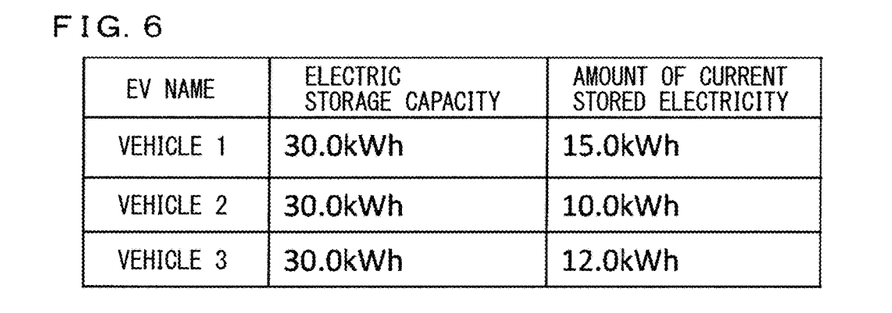
FIG. 6 A table illustrating an example of facility information of rechargeable batteries mounted on electric vehicles according to the first embodiment.

FIG. 6 is a table illustrating an example of facility information of rechargeable batteries mounted on EVs. In the example of FIG. 6, the power storage capacity and the power storage amount of a rechargeable battery mounted on an EV are managed. More specifically, the facility information of the rechargeable battery manages information of EV name, power storage capacity, and current power storage amount. However, the information to be managed is not limited thereto, and information such as charging efficiency and the like may be managed and is not limited to the example of FIG. 6. In the example of FIG. 6, the power storage capacity of Vehicle 1 is 30.0 kWh and the current power storage amount thereof is 15.0 kWh, the power storage capacity of Vehicle 2 is 30.0 kWh and the current power storage amount thereof is 10.0 kWh, and the power storage capacity of Vehicle 3 is 30.0 kWh and the current power storage amount thereof is 12.0 kWh. The current power storage capacity is updated as required according to the current situation.

When the total charging power is 30 kW and the power storage amount of each EV is the example of FIG. 6, and the distribution is performed based on the difference between the power storage capacity and the current power storage amount, the individual charging power determination unit 205 first calculates the difference between the power storage capacity and the current power storage amount for each EV, normalizes to make the sum be 1.0, and distributes the total charging power at the normalized value. As a result, it is calculated that Vehicle 1 is about 8.5 kW, Vehicle 2 is 11.3 kW, and Vehicle 3 is about 10.2 kW.

Here, although the individual charging power determination unit 205 distributes the total charging power based on the difference between the power storage capacity and the current power storage amount, it is not limited thereto, and the distribution of the total charging power may be performed by normalizing the total charging power to make the sum be 1.0 based on the power storage amount. The method thereof is not limited as long as it is a method of distributing based on the ratio of the facility information of the rechargeable battery mounted on the EV.

Also, when the total charging power is distributed to each EV, the individual charging power determination unit 205 may start to distribute the total charging power to the EV of a higher priority level and determine the individual charging power for each time. Here, the individual charging power determination unit 205 determines the priority level of the EV based on the facility information of the rechargeable battery mounted on the EV. For example, the individual charging power determination unit 205 may calculate the difference between the power storage capacity and the power storage amount, and determine to put the EV with the larger difference to the higher priority level.

Further, the individual charging power determination unit 205 may calculate the remaining time from the current time to the scheduled departure time for each EV, and may determine to put the EV having less remaining time to the higher priority level. Further, the individual charging power determination unit 205 may determine to put the EV having a greater required amount of stored electricity at departure to the higher priority level based on the required amount of stored electricity at departure of each EV.

In addition, the individual charging power determination unit 205 may calculate the difference between the power storage amount and the required amount of stored electricity at departure (the required amount of stored electricity at departure–the power storage amount) for each EV, and determine to put the EV with the larger difference to the higher priority level. Further, the individual charging power determination unit 205 may calculate a value obtained by dividing the difference between the power storage amount and the required amount of stored electricity at departure (the required amount of stored electricity at departure–the power storage amount) by the remaining time from the current time to the scheduled departure time of each EV for each EV, and determine to put the EV with the larger difference to the higher priority level Here, although several methods of determining the priority levels have been described, the present invention is not limited thereto, and the user may arbitrarily determine the priority levels.

The individual charging power determination unit 205 starts to distribute the total charging power from the EV with the higher priority level based on the determined priority levels, and in this case, distributes as much individual charging power as possible to the EV with the higher priority. Further, when the individual charging power determination unit 205 distributes the total charging power based on the reference value such as the power storage amount, individual charging power may be distributed to the EV with the higher priority by multiplying the distribution by a larger coefficient (weighted). The priority level is information for specifying the EV to which the total charging power is preferentially distributed, and the method is not limited as long as the total charging power is preferentially distributed.

Next, the details of the command value notification unit 206 will be described. The command value notification unit 206 determines the control value based on the individual charging power for each time and for each EV determined by the individual charging power determination unit 205, and notifies the controller (HEMS, FEMS, BEMS) controlling the chargers of each facility 102 or EV user of the command value based on the control value. The notification may be sent to a dedicated application that can control the charging of the EVs, such as the charging control device of each facility 102. As a notification method to the EV user, a mobile terminal of the EV user may be notified.

Figure 7:
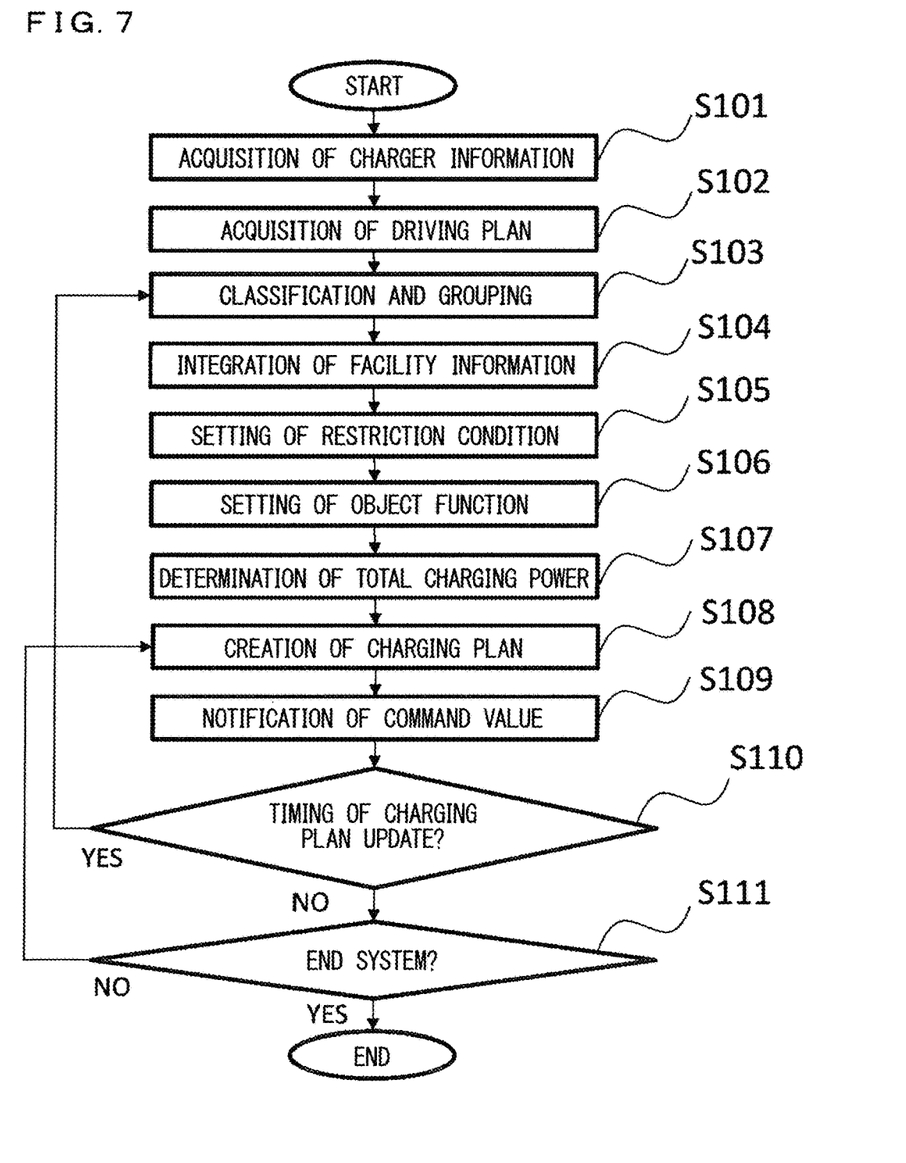
FIG. 7 A flowchart illustrating a processing flow of the charging power management device according to the first embodiment.

FIG. 7 is a flowchart illustrating a processing of the charging power management device 101. The present embodiment will be described below with reference to the flowchart of FIG. 7.

First, in a charger information acquisition Step S101, the charger information management unit 201 acquires and manages the facility information of the chargers. More specifically, the charger information management unit 201 acquires and manages the rated output of the chargers that each facility 102 holds, to which the EVs are to be connected. The charger information management unit 201 may manage the facility information of the chargers, or may obtain the facility information from an external database or the like.

Next, in a driving plan acquisition Step S102, the driving plan management unit 202 acquires the driving plan for the EV. More specifically, the driving plan management unit 202 acquires the scheduled arrival time to the facility 102, the scheduled departure time from the facility 102, the scheduled arrival facility, the required amount of stored electricity at departure, and the like, for the EV. The driving plan management unit 202 may manage the driving plans, or may acquire the same from an external database or the like.

Next, in a group classification Step S103, the grouping unit 203 groups a plurality of EVs into an EV cluster based on the classification rule and the driving plan. Here, as described above, the grouping unit 203 may group a plurality of EVs according to the classification rule that does not use the driving plan. The target to be grouped is not limited as long as it is substantially an EV. For example, the driving plan may be controlled to be grouped.

Next, in a facility information integration Step S104, the total charging power determination unit 204 integrates facility information such as facility information of the charger and facility information of the rechargeable battery mounted on the EV. The total charging power determination unit 204 integrates the facility information of the EV and the facility 102 (such as information on current power storage amount, power storage capacity and charging efficiency in the facility information of the rechargeable battery mounted on the EV), and information of rated output in the facility information of the charger, so as to determine information such as the current power storage amount, the power storage capacity, the controllable range, the maximum charging power, and the charging efficiency for the entire group. The description of the integration of each piece of information is what is described in the above-mentioned total charging power determination unit 204.

Next, in a restriction condition setting Step S105, the total charging power determination unit 204 sets the restriction condition for the optimizing problem optimizing (determining) the total charging power of each group based on the information or the like integrated in the facility information integration Step S104. The total charging power determination unit 204 sets restriction conditions such as the upper and lower limits of the total charging power, the upper and lower limits of the controllable range of the planned value of the integrated power storage amount of the EVs, and the restriction equations representing the state change of the total planned value.

The content of the restriction conditions is what is described in the description of the total charging power determination unit 204. Next, in an objective function setting Step S106, the total charging power determination unit 204 sets the objective function for the optimization problem optimizing (determining) the charging plan for each group. The content of the objective function is what is described in the description of the total charging power determination unit 204.

Next, in a total charging power determination Step S107, the total charging power determination unit 204 solves, using the optimization solver, the optimization problem set in the facility information integration Step S104, the restriction condition setting Step S105, and the objective function setting Step S106. The total charging power determination unit 204 determines the total charging power being the charging power for the EV cluster, for each group and for each time based on the restriction conditions.

Next, in a charging plan creation Step S108, the total charging power determination unit 204 creates a charging plan for each group based on the total charging power determined in the total charging power determination Step S107. The charging plan is not limited to the hourly total charging power plan or the hourly power storage amount plan.

Next, in a command value notification Step S109, the individual charging power determination unit 205 distributes the total charging power determined by the total charging power determination unit 204 to each EV and determines the individual charging power. And the command value notification unit 206 determines the control value based on the individual charging power determined by the individual charging power determination unit 205, and notifies the controller (HEMS, FEMS, BEMS) controlling the chargers of each facility 102 or EV user of the command value based on the control value. The method of determining the individual charging power of each EV is what is described in the individual charging power determination unit 205.

Next, in an update determination Step S110, an update determination unit determines whether or not it is the timing of the charging plan update. If it is determined that the update timing is reached, the process returns to the group classification Step S103 and the process is repeated. The update of the charging plan may be performed at an arbitrary interval, or the update of the charging plan may be determined by using the update of the driving plan as a trigger. The update determination unit is not illustrated.

Next, in a system end determination Step S111, an end determination unit determines whether or not to end the system. If it is not determined to end, the process returns to the charging plan creation Step S108, and the process is repeated. If it is determined to end, the process ends. The end of the process may be determined by inputting an end command from the user, or may be determined to end when a specific time arrives, and the method of determination is not limited. The end determination unit is not illustrated.

Figure 8:
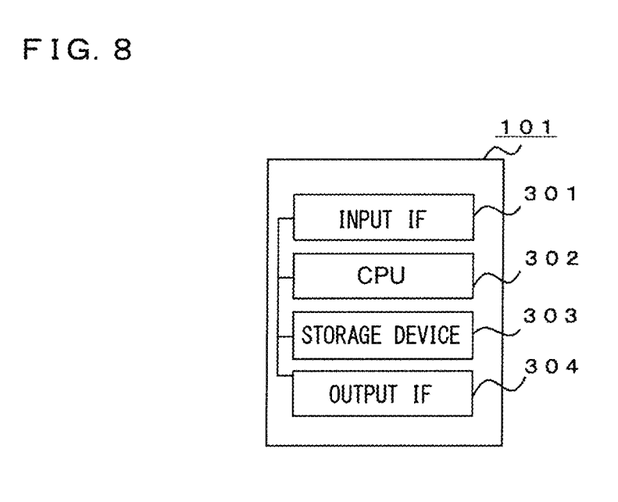
FIG. 8 A hardware configuration diagram of the charging power management device in the first embodiment.

FIG. 8 is a hardware configuration diagram of the charging power management device 101. The charging power management device 101 includes an input interface 301, a Central Processing Unit (CPU) 302, a storage device 303, and an output interface 304. The interface is hereinafter referred to as IF.

The information stored in the charger information management unit 201, the driving plan management unit 202, and the like, is acquired through the input IF 301. The acquired data is stored in the storage device 303, and the functions of the grouping unit 203, the total charging power determination unit 204, the individual charging power determination unit 205, and the like are implemented by the CPU 302 executing a program.

Information such as the facility information of the charger, the facility information of the rechargeable battery, and information of the driving plan may be acquired from the outside through the input IF301. The command value notification unit 206 outputs a command value from an output IF 304 based on the charging plan created by the individual charging power determination unit 205. The charging plan per se may be output from the output IF 304 and a command value may be output by an external device.

The IF is a wired port such as a cable port, a USB port, a direct connection port, or a wireless network port. The storage device 303 is a storage medium such as an HDD, an SSD, and a flash memory. The processing of each of these processing units is processed by a calculator such as a computer.

As described above, the charging power management device 101 groups EVs based on the classification rule, gives the restriction condition and the objective functions regarding to the grouped EV cluster to define the optimization problem, so as to determine the total charging power, determining the individual charging power based on the total charging power.

With such a mechanism, the number of conditional equations such as restriction conditions is reduced more than in the case of defining the optimization problem for each EV, ensuring the suppression of in the increase in computational resources when solving the optimization problem associated with the creation of a charging plan.

EXPLANATION OF REFERENCE SIGNS

101 charging power management device, 201 charger information management unit, 202 driving plan management unit, 203 grouping unit, 204 total charging power determination unit, 205 individual charging power determination unit, 206 command value notification unit.

The invention claimed is:

1. A charging power management device comprising:
grouping circuitry configured to group a plurality of electric vehicles to be charged based on a classification rule;
total charging power determination circuitry configured to set a restriction condition for restricting charging an integrated electric vehicle in which the electric vehicles in the group are integrated based on information of storage batteries and information of chargers of the electric vehicles in the group, and determine total charging power of the integrated electric vehicle for each time based on the restriction condition; and
individual charging power determination circuitry configured to distribute the total charging power to the electric vehicles in the group integrated into the integrated electric vehicle, and determine individual charging power for each of the electric vehicles for each time based on the total charging power,
wherein the grouping circuitry is configured to group the electric vehicles based on the classification rule using a driving plan of the electric vehicles, and
when a plurality of different types of information included in the driving plan are expressed with vectors, the grouping circuitry is configured to group the electric vehicles whose Euclidean distance between the vectors is a threshold or lower, in a same group.

2. The charging power management device according to claim 1, wherein
the driving plan includes information to specify a facility at which the electric vehicles are to be charged, and
the classification rule is a rule for grouping the electric vehicles having a same facility into a same group.

3. The charging power management device according to claim 1, wherein
the driving plan includes information on at least one of scheduled arrival time for the electric vehicles to a facility at which the electric vehicles are to be charged, scheduled departure time of the electric vehicles from the facility, and required amount of stored electricity at departure, and
the classification rule is a rule for grouping the electric vehicles based on the driving plan.

4. The charging power management device according to claim 1, wherein
the restriction condition is a condition in which a capacity is less than or equal to a combined rated outputs of chargers to which the electric vehicles each are to be connected.

5. The charging power management device according to claim 1, wherein
the restriction condition is a condition in which a power purchase cost is minimized.

6. The charging power management device according to claim 1, wherein
the individual charging power determination circuitry is configured to distribute the total charging power based on a value indicating a difference between a power storage capacity and a current power storage amount of the storage batteries mounted on the electric vehicles when a total value of the difference is normalized to a fixed value and determine the individual charging power for each time.

7. The charging power management device according to claim 1, wherein
the individual charging power determination circuitry is configured to determine priority levels of the electric vehicles based on a remaining time until a departure of the electric vehicles, and start to distribute the total charging power to electric vehicles of higher priority levels and determine the individual charging power for each time.

8. The charging power management device according to claim 1, wherein
the driving plan includes information to specify a facility at which the electric vehicles are to be charged.

9. The charging power management device according to claim 1, wherein
the driving plan includes information on at least one of scheduled arrival time for the electric vehicles to a facility at which the electric vehicles are to be charged, scheduled departure time of the electric vehicles from the facility, and required amount of stored electricity at departure.

10. A charging power management method comprising:
grouping a plurality of electric vehicles to be charged based on a classification rule;
setting a restriction condition for restricting charging an integrated electric vehicle in which the electric vehicles in the group are integrated based on information of storage batteries and information of chargers of the electric vehicles in the group, and determining total charging power of the integrated electric vehicle for each time based on the restriction condition;

distributing the total charging power to the electric vehicles in the group integrated into the integrated electric vehicle, and determining individual charging power for each of the electric vehicles for each time based on the total charging power;

grouping the electric vehicles based on the classification rule using a driving plan of the electric vehicles; and when a plurality of different types of information included in the driving plan are expressed with vectors, grouping the electric vehicles whose Euclidean distance between the vectors is a threshold or lower, in a same group.

11. The charging power management method according to claim 10, wherein the driving plan includes information to specify a facility at which the electric vehicles are to be charged, and the classification rule is a rule for grouping the electric vehicles having a same facility into a same group.

12. The charging power management method according to claim 10, wherein the driving plan includes information on at least one of scheduled arrival time for the electric vehicles to a facility at which the electric vehicles are to be charged, scheduled departure time of the electric vehicles from the facility, and required amount of stored electricity at departure, and the classification rule is a rule for grouping the electric vehicles based on the driving plan.

13. The charging power management method according to claim 10, wherein the restriction condition is a condition in which a capacity is less than or equal to a combined rated outputs of chargers to which the electric vehicles each are to be connected.

14. The charging power management method according to claim 10, wherein the restriction condition is a condition in which a power purchase cost is minimized.

15. The charging power management method according to claim 10, further comprising:

distributing the total charging power based on a value.

16. The charging power management method according to claim 10, wherein the driving plan includes information to specify a facility at which the electric vehicles are to be charged.

17. The charging power management method according to claim 10, wherein the driving plan includes information on at least one of scheduled arrival time for the electric vehicles to a facility at which the electric vehicles are to be charged, scheduled departure time of the electric vehicles from the facility, and required amount of stored electricity at departure.

* * * * *